United States Patent
Ohringer

[11] 3,834,269
[45] Sept. 10, 1974

[54] STRESS INDICATING BOLT
[76] Inventor: Jack G. Ohringer, 1435 Dolores St., San Francisco, Calif. 94110
[22] Filed: Oct. 24, 1972
[21] Appl. No.: 300,087

[52] U.S. Cl. ..................................... 85/62, 151/37
[51] Int. Cl. .......................................... F16b 31/02
[58] Field of Search .................... 85/62; 151/37, 38

[56] References Cited
UNITED STATES PATENTS

| | | | |
|---|---|---|---|
| 460,266 | 9/1891 | Nicholl | 151/37 |
| 2,517,476 | 8/1950 | Frost | 151/38 |
| 2,546,332 | 3/1951 | Costello | 85/62 |

*Primary Examiner*—Edward C. Allen
*Attorney, Agent, or Firm*—R. S. Sciascia; Charles D. B. Curry

[57] ABSTRACT

A stress indicating nut or bolt having a wedged slit formed near the bottom of the side of the head. The slit is formed by a non-material removing technique such as forging or the like. The formation of the slit results in the formation of a lip that extends below the lower plane surface of the head of the nut or bolt. The size and angle of the lip are selected to prevent exceeding the elastic limit of the lip when it is closed by tightening the nut or bolt against a surface. When the slit is closed, the stress in the bolt shank is accurately known. Alternatively, the lip may be partially closed wherein the degree of closure indicates shank stress. In the preferred embodiment two oppositely positioned lips are formed and each lip is curved to provide great lip elasticity and to prevent surface scoring.

1 Claim, 12 Drawing Figures

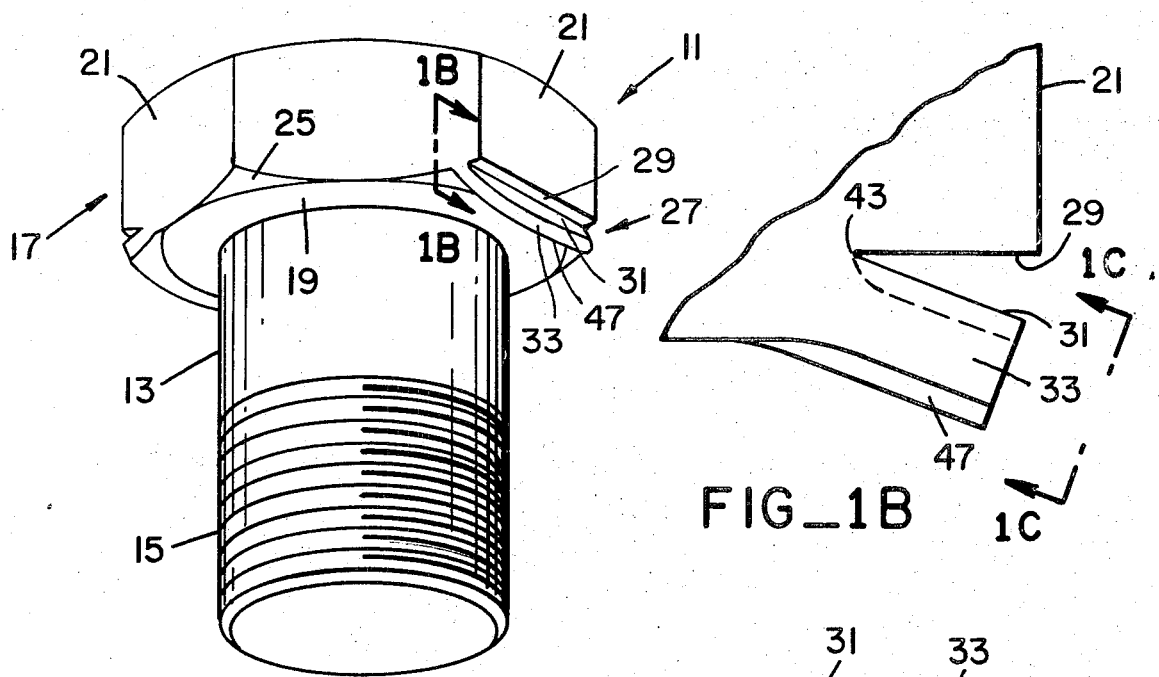
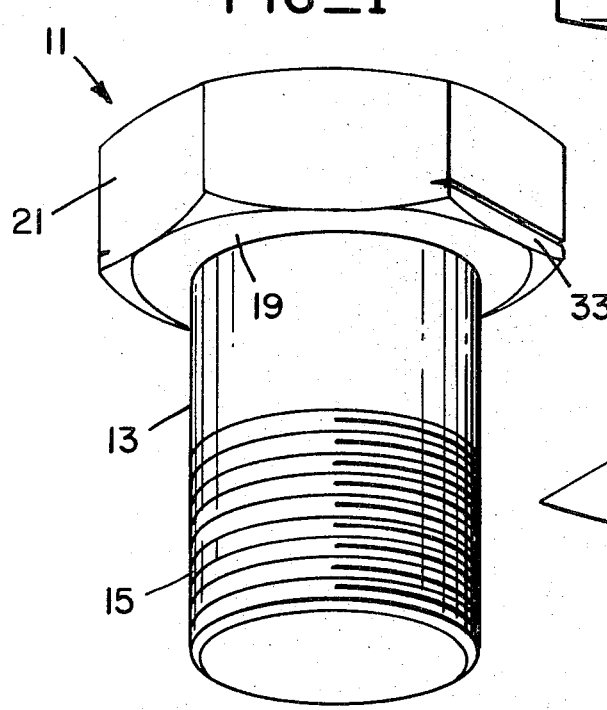
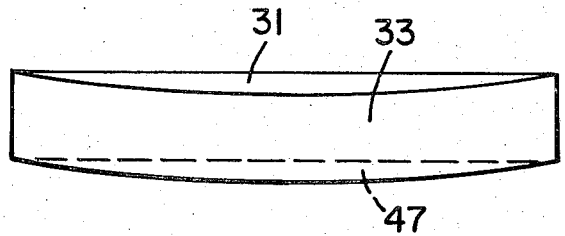
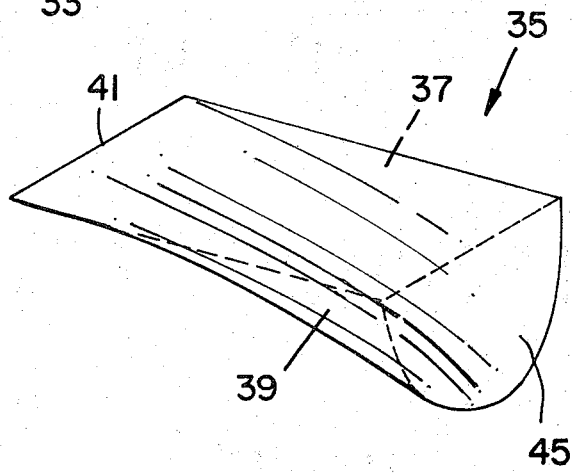

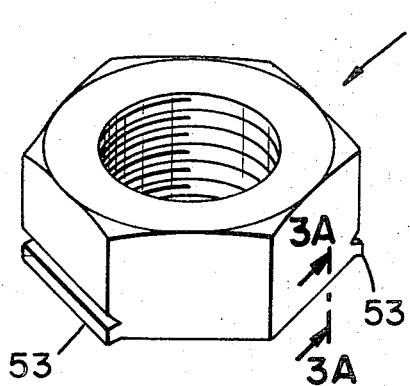
FIG_3
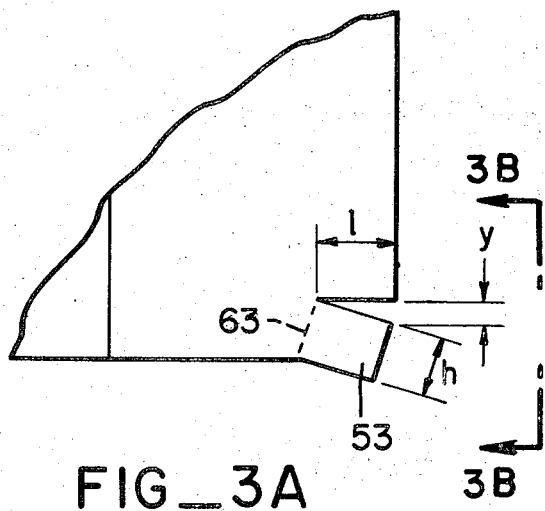
FIG_3A
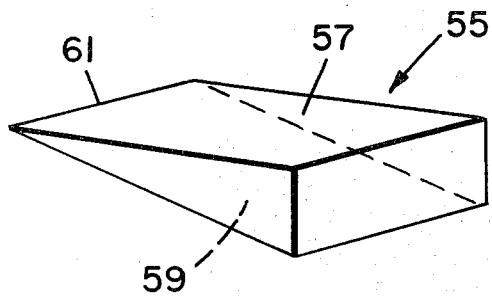
FIG_4
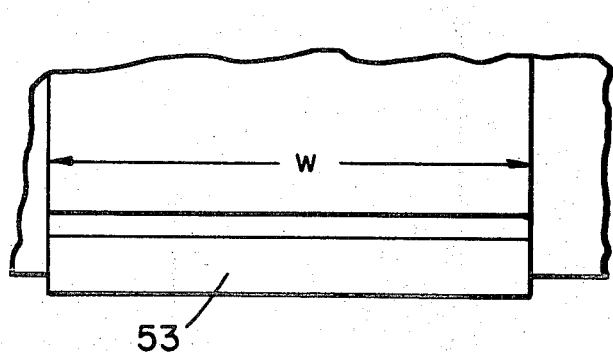
FIG_3B
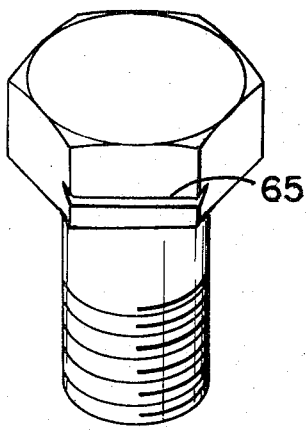
FIG_5
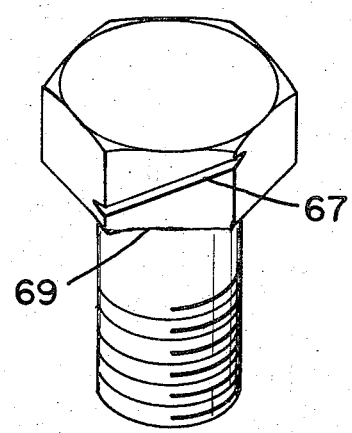
FIG_6
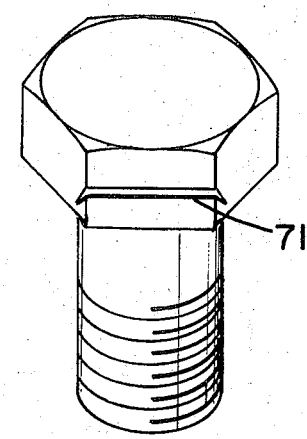
FIG_7

STRESS INDICATING BOLT

The invention described herein may be manufactured and used by or for the Government of the United States of America for governmental purposes without the payment of any royalties thereon or therefor.

BACKGROUND OF THE INVENTION

1. Field of the Invention

The present invention relates to a holding deivce, and more particularly, to a stress indicating nut or bolt.

2. Description of the Prior Art

The measurement of torque applied to the head of a nut or bolt is the commonly practiced method for indicating bolt tightness. This method has a disadvantage when the coefficient of frictions between the bolts and the surface against which they are tightened are different. This is because the stress in the shank of the bolt is what is of real importance to the mechanic or engineer because this indicates thread forces which are of major importance due to their operational requirements within the elastic limit. Also, the shank stress indicates the actual force exerted by the bolt in holding parts together. Tests have shown that different surface conditions result in extreme variations in coefficients of friction wherein the same torque results in extreme differences in stress in the shank of the bolt. These stress differences may be as much as 90 percent.

The stress indicating bolt of the present invention provides a very accurate measure of the shank stress, regardless of the different surface conditions, because the vertical force is measured directly. Also, no metal is removed from the nut or bolt in making the slit, as distinguished from a groove made by a metal removal process.

SUMMARY OF THE INVENTION

A stress indicating nut or bolt having a wedged slit formed near the bottom of the side of the head. The slit is formed by a non-material removing technique such as forging or the like. The formation of the slit results in the formation of a lip that extends below the lower plane surface of the head of the nut or bolt. The size and angle of the lips are selected to prevent exceeding the elastic limit of the lip when it is closed by tightening the nut or bolt against a surface. When the slit is closed, the stress in the bolt shank is accurately known. Alternatively, the lip may be partially closed wherein the degree of closure indicates shank stress. In the preferred embodiment two oppositely positioned lips are formed and each lip is curved to provide greater lip elasticity and to prevent surface scoring.

STATEMENT OF THE OBJECTS OF THE INVENTION

An object of the present invention is to provide an accurate and reliable stress indicating nut or bolt.

Another object of the present invention is to provide a stress indicating nut or bolt that is inexpensive to manufacture.

Still another object of the present invention is to provide a stress indicating nut or bolt that is formed without removing any metal from the nut or bolt.

BRIEF DESCRIPTION OF THE DRAWINGS

FIG. 1 is a pictorial view of the stress indicating bolt of the present invention when the bolt is not tightened;

FIG. 1A is a pictorial view of the stress indicating bolt of FIG. 1 when the bolt is tightened;

FIG. 1B is an enlarged side elevation of the stress indicating lip of the bolt of FIG. 1;

FIG. 1C is an end view of the lip of FIG. 1B;

FIG. 2 is a mandrel that may be used to form the wedged slit of the bolt of FIGS. 1 - 1C;

FIG. 3 is a pictorial view of another embodiment of the stress indicating nut of the present invention;

FIG. 3A is an enlarged view of the lip and slit of the nut of FIG. 3;

FIG. 3B is a front view of the lip and slit shown in FIG. 3A;

FIG. 4 is a mandrel that may be used to form the wedged slit of the nut of FIGS. 3 - 3B;

FIG. 5 is a pictorial view of another embodiment of the bolt of the present invention;

FIG. 6 is a pictorial view of still another embodiment of the bolt of the present invention; and FIG. 7 is a pictorial view of still another embodiment of the bolt of the present invention.

DESCRIPTION OF THE PREFERRED EMBODIMENT

In FIGS. 1 through 1C is illustrated the preferred embodiment of the stress indicating bolt 11 of the present invention. Stress indicating bolt 11 includes a cylindrical shank 13 having threads 15 and head 17. Head 17 includes shoulder 19, a plurality of lateral surfaces 21, chamfer 25, and an elongated opening or wedged slit 27. Wedged slit 27 has an upper surface 29 and a lower surface 31. The material between lower surface 31 and shoulder 19 forms a stress indicating lip 33. It is to be understood that virtually any configuration of nut or bolt may be used with the stress indicating lip of the present invention. For example, any number of lateral surfaces may be used, including a circular surface, and the bolt may be of virtually any size, configuration, surface finish or material provided it is compatible with the teachings of the present invention as hereinafter described in detail.

In FIG 1A is illustrated the stress indicating bolt 11 of FIG. 1 after it has been tightened against a surface, not shown. One of the primary advantages of the stress indicating bolt of the present invention is that stress indicating lip 33 will return to the original position, shown in FIG. 1, after the tightened bolt of FIG. 1A is loosened and removed. From this it can be seen that the bolt is reusable to indicate bolt stress and also serves to lock the bolt in place. It should be particularly noted that the closing of stress indicating lip 33 does not necessarily indicate the torque on the bolt, but rather, it accurately and directly indicates the stress on shank 15 of the bolt. The stress in shank 15 is what is of real interest to the mechanic or engineer because this indicates thread forces which are of major importance due to their operational requirements within the elastic limit. Also, the shank stress indicates the actual force exerted by the bolt in holding parts together and affects its fatigue sustaining ability. The torque applied to a bolt is often a rather inaccurate measure of the stress established in the shank. This is primarily because the great variance of the coefficient of surface frictions of the shoulders of different bolts as well as the varieties of surfaces upon which the shoulder slides and is tightened. Tests have shown that different surface conditions result in extreme variations in coefficients of friction wherein the same torque results in extreme differences in stress in the shank of the bolt. With the same torque these stress differences may be as much as 90 percent. The stress indicating bolt of the present invention provides a very accurate measure of the shank stress, regardless of the different surface conditions, because the vertical force applied to lip 33, by the surface against which it is tightened, is independnet of the surface friction.

In FIG. 1B is illustrated an enlarged side elevation of the stress indicating lip 33 of FIG. 1 and FIG. 1C is an end view of lip 33 of FIG. 1B. In the embodiment of FIGS. 1 – 1C, wedged slit 27 and lip 33 may be formed by a mandrel 35, as illustrated in FIG. 2. The mandrel has a flat upper surface 37, a curved lower surface 39 and edge 41 that is straight and nearly sharp. Edge 41 may be provided with a slight radius to form fillet 43 of FIG. 1B. The wedged slit 33 is formed by holding the sharp edge 41 of the mandrel against the lateral surface of bolt 11 and then striking end 45 of the mandrel. Also, the mandrel may be incorporated within a die for use in production manufacturing. In this manner curved lip 33 is formed, having curved surfaces 31 and 47. Curving lip 33 in this manner provies additional lip elasticity and also minimizes scoring the surface against which the bolt is tightened.

In FIGS. 3, 3A and 3B is illustrated a stress indicating nut 51 of the present invention. In this embodiment the lip 53 is made straight and may be formed by mandrel 55 of FIG. 4. Mandrel 55 has a flat top surface 57 and a sloping flat bottom surface 59 forming a sharp straight edge 61. In FIGS. 3A and 3B, the length of the lip is indicated by reference $l$, the height of the lip by reference $h$ and the width by reference $w$. It has been found that a $l/h$ ratio of about 1.0 to about 1.3 is satisfactory for most purposes. Reusability of the nut is determined by whether or not the yield point of the material at the root of the lip, indicated by dotted lines 63 of FIG. 3A, has been exceeded when the lip is closed. The lip opening, indicated by y in FIG. 3A, is normally selected so as to prevent exceeding the elastic limit of the root. (The area A of the root is hw.) Also, the force required to close the lip is determined by the root area A and the lever arm which is the length $l$ of the lip which forms a cantilever beam.

In FIGS. 5, 6 and 7 are illustrated alternative embodiments of the stress indicating bolt of the present invention. The FIG. 5 embodiment illustrates a bolt having a slit 65 that extends in the upward direction. In the FIG. 6 embodiment, the slit 67 is at an angle to the horizontal shoulder 69. The FIG. 7 embodiment illustrates a bolt having a slit 71 that extends in the downward direction.

It should be noted that the slit may be formed by any non-material removing technique. However, it has been found that the yield point of the root is increased by cold forming or forging the slit. It will be obvious to one skilled in the art that the slits in the nuts and bolts of the present invention may be formed by automated machines.

It should also be noted that the bolt provides a variable stress indication which may be determined by measuring the distance y. The stress is determined by predetermined bolt elongation tests or torquing.

In the previously described embodiments, the lips may be covered with protective coatings. One example of such coating would be to coat the upper surface with epoxy and the lower surface with epoxy hardener. When the lip is closed, the epoxy and hardener react and permanently seal the lip. This could be done when reusability is not a factor.

It is to be understood that the above teachings of the stress indicating slit of the present invention are applicable to nuts and bolts and the like.

What is claimed is:
1. A stress indicating fastening device comprising:
   a. a body having an upper face, a lower shoulder having a plane surface and at least one lateral face on the periphery of said body extending between said upper face and said shoulder;
   b. an elongated wedged slit formed in said at least on lateral face of said body;
   c. said elongated wedged slit forming a lip between said wedged slit and a part of said lower shoulder;
   d. said elongated wedged slit being a non-material removing curved cut in said body;
   e. said lip extending below the plane surface of said lower shoulder;
   f. the ratio of the length of said wedged lip to the height of said wedged lip is from about 1:1 to bout 1.3:1;
   g. the outer edge forming the width of said lip being formed entirely from said lateral face and being in about the same plane;
   h. said lip having a curved crossection in a plane parallel to said outer edge of said lip; wherein
   i. tightening said fastening device results in closing said wedges slit by moving said lip in a direction toward said plane surface of said lower shoulder wherein he degree of closure of said wedged slit indicates stress applied by said fastening device and complete tightening of said fastening device results in full closure of said lip.

* * * * *